United States Patent [19]

Yuo et al.

[11] Patent Number: 5,516,879

[45] Date of Patent: May 14, 1996

[54] CATALYTIC COMPOSITIONS FOR THE PREPARATION OF POLY(BUTYLENE TEREPHTHALATE)

[75] Inventors: Wu-Bin Yuo; Wen-Jeng Lin, both of Hsinchu; Hsin-Herng Wang, Taichung; Jian-Hong Chen, Hsinchu, all of Taiwan

[73] Assignee: Industrial Technology Research Institute, Hsinchu, Taiwan

[21] Appl. No.: 413,025

[22] Filed: Mar. 28, 1995

[51] Int. Cl.⁶ .................................... C08G 63/02
[52] U.S. Cl. ................... 528/287; 528/176; 528/193; 528/194; 528/195; 528/272; 528/274; 528/275; 528/280; 528/281; 528/285; 502/153; 502/155; 502/161; 502/208; 502/170; 502/171
[58] Field of Search .................................. 528/176, 193, 528/194, 195, 272, 274, 275, 287, 280, 281, 285; 502/153, 155, 161, 208, 170, 171

[56] References Cited

U.S. PATENT DOCUMENTS 4,906,724  3/1990  Yamanaka et al. .................... 528/193

*Primary Examiner*—James J. Seidleck
*Assistant Examiner*—Terressa Mosley
*Attorney, Agent, or Firm*—W. Wayne Liauh

[57] ABSTRACT

A catalyst composition for use in the preparation of poly(butylene terephthalate) from dimethyl terephthalate, comprising: (a) a titanium compound primary catalyst, from about 0.01 PHR to about 1 PHR; and (b) an alkali metal phosphate or alkali metal phosphite co-catalyst, from about 0.001 PHR to about 1 PHR; wherein PHR represents parts of the primary catalyst or the co-catalyst per one hundred parts, by weight, of dimethyl terephthalate. Preferred titanium compounds include tetrabutyl titanate or tetra(isopropyl) titanate; the alkali metal phosphate can be a phosphate salt containing one, two, or three metal groups; and the alkali metal phosphite can be a phosphite salt containing one or two metal groups. With this catalyst composition, the transesterification rate was increased by 10 percent or more. Furthermore, the reaction product poly(butylene terephthalate) shows an increased intrinsic viscosity over those without the co-catalyst, indicating a greater degree of polymerization.

15 Claims, 1 Drawing Sheet

CATALYTIC COMPOSITIONS FOR THE PREPARATION OF POLY(BUTYLENE TEREPHTHALATE)

FIELD OF THE INVENTION

The present invention relates to a novel catalytic composition for the preparation of poly(butylene terephthalate). More specifically, the present invention relates to a novel tetrabutyl titanate based catalyst composition for accelerating the rate of transesterification and polymerization during the preparation of poly(butylene terephthalate) from the dimethyl terephthalate (DMT) process.

BACKGROUND OF THE INVENTION

Poly(butylene terephthalate), or PBT, is an important polyester fiber; it is also an important crystalline thermoplastic resin. Polyester fibers, which show good resistance to most mineral acids and display excellent resistance to cleaning solvents and surfactants, are now the world's leading synthetic fibers. Crystalline thermoplastic poly(butylene terephthalate), along with other crystalline thermoplastic poly(alkylene terephthalates), such as poly(ethylene terephthalates), exhibits many favorable physical, mechanical, and electrical properties, and is considered one of the most important engineering plastics.

Poly(butylene terephthalate) is manufactured commercially by the so-called DMT (dimethyl terephthalate) or TPA (terephthalic acid) process, both of which typically use tetrabutyl titanate as the catalyst.

In the conventional DMT process for making poly(butylene terephthalate), dimethyl terephthalate (DMT) and butylene glycol (i.e., 1,4-butanediol, BDO) are used as the raw materials which are reacted at 220°~260° C., using tetrabutyl titanate as the catalyst to effectuate a transesterification reaction and form an intermediate product, which is bis(2-hydroxybutyl terephthalate) (BHBT). The intermediate product bis(2-hydroxybutyl terephthalate) is then subject to a high temperature (250°~290° C.) and high vacuum (less than 1 torr) to effectuate a condensation polymerization. After the reaction, the unreacted butylene glycol is removed to obtain the poly(butylene terephthalate) final product.

The TPA process has not been as commercially successful as the DMT process for the manufacturing of poly(butylene terephthalate). In the conventional TPA process, terephthalic acid (TPA) and butylene glycol are used as the raw material which are reacted at 220°~265° C. to effectuate a transesterification reaction, using tetrabutyl titanate as the catalyst. An intermediate product of bis(2-hydroxybutyl terephthalate) is formed after dehydration of the terephthalic acid (TPA) and butylene glycol as a result of the esterification reaction therebetween. The intermediate product of bis(2-hydroxybutyl terephthalate) is similarly subject to a high temperature (250°~290° C.) and high vacuum (less than 1 torr) condensation polymerization. After the completion of the reaction, the unreacted butylene glycol is removed from the reaction product to obtain the poly(butylene terephthalate) final product.

Because of the high commercial value and large volume of poly(butylene terephthalate), any incremental improvement in the production rate thereof is very significant. Therefore, it is important to improve the performance of the tetrabutyl titanate based catalyst composition. Furthermore, an increased production rate would also reduce the time during which the expensive tetrabutyl titanate catalyst is subject to the possibility of being poisoned, per unit volume of poly(butylene terephthalate) produced. This can also result in important cost savings in the production of poly(butylene terephthalate).

SUMMARY OF THE INVENTION

The primary object of the present invention is to develop an improved tetrabutyl titanate or tetra(isopropyl)titanate based catalyst composition for the preparation of poly(butylene terephthalate). More specifically, the primary object of the present invention is to develop an improved tetrabutyl titanate or tetra(isopropyl)titanate based catalyst composition, which contains tetrabutyl titanate as the primary catalyst and one or more of alkali metal phosphates or alkali metal phosphites as co-catalyst, for accelerating the transesterification and polymerization rates during the production of poly(butylene terephthalate) from the dimethyl terephthalate (DMT) process.

The improved tetrabutyl titanate or tetra(isopropyl)titanate based catalyst composition disclosed in the present invention contains (1) between about 0.01 PHR and about 1 PHR of a primary catalyst tetrabutyl titanate, and (2) between about 0.001 PHR and 1 PHR of an alkali metal phosphate or an alkali metal phosphite co-catalyst. In the above designation, PHR stands for parts per hundred parts, by weight, of dimethyl terephthalate. The alkali metal phosphate that can be used as a co-catalyst disclosed in the present invention can be a phosphate salt containing one, two, or three metal groups. Examples of the alkali metal phosphates include trisodium phosphate, disodium hydrogen phosphate, and sodium dihydrogen phosphate. And the alkali metal phosphite that can be used as a co-catalyst disclosed in the present invention can be a phosphite salt containing one or two metal groups. Examples of the alkali metal phosphites include disodium hydrogen phosphite, and sodium dihydrogen phosphite.

In using the improved tetrabutyl titanate based catalyst composition disclosed in the present invention, the primary catalyst and co-catalyst can be added into the reaction mixture containing dimethyl terephthalate and butylene glycol. Or preferably, the co-catalyst is first mixed with dimethyl terephthalate and the tetrabutyl titanate primary catalyst is mixed into butylene glycol, which is a liquid. The reactant butylene glycol is typically in excess relative to the dimethyl terephthalate reactant. Then the two mixtures are mixed together to form the reaction mixture. Typically, the reaction is conducted in two stages, a transesterification stage followed by a polymerization stage. The polymerization reaction is typically conducted at a higher temperature and higher vacuum than the transesterification stage.

With the addition of the alkali metal phosphate or alkali metal phosphite co-catalyst disclosed in the present invention, the transesterification rate can be increased by 10 percent or more. Furthermore, the reaction product poly(butylene terephthalate) shows an increased intrinsic viscosity over those without the co-catalyst, indicating a greater degree of polymerization by adding the alkali metal phosphate or alkali metal phosphite co-catalyst disclosed in the present invention.

In Netherland Pat. App. No. NL 86/2,460 (also appeared as EP 264,143; EP 87-201,541; and DE 3,765,514), it is disclosed an aromatic polyester blend, in which disodium diphosphate $Na_2H_2PO_4$ is added to a blend of poly(butylene terephthalate) and bisphenol A polycarbonate as a stabilizer. In Japan Laid-Open Patent Application JP 61-31,455 (also appeared in JP 92-061,903), it is disclosed a process for melt-molding polymer composition by which metal phosphates and/or phosphites are added, as viscosity stabilizers, to blends of aromatic polyesters, including poly(ethylene terephthalate) and poly(1,4-butylene terephthalate), and bisphenol A or bromobisphenol A polycarbonates. In U.S. Pat. No. 4,532,290, it is disclosed a stabilized polycarbonate-polyester composition, in which a thermoplastic composition containing a polycarbonate and a terephthalate polyester is melt stabilized with $NaH_2PO_4$ and/or $KH_2PO_4$. In Japan Patent 75-67,355, it is disclosed a polyester molding composition with good color stability containing poly(tetramethylene terephthalate), bisphenol A polycarbonate, butadiene-methyl methacrylate-styrene graft copolymer, and $NaH_2PO_4$. The composition has exhibited good moldability, chemical resistance, mechanical properties, heat-distortion resistance, and color. None of these references teaches the use of phosphate or phosphite as a co-catalyst for use with tetrabutyl titanate, for the production of poly(butylene terephthalate) from dimethyl terephthalate.

In U.S. Pat. No. 4,780,527, Tong, Chen, Yuo, and Chang teach a catalyzed process for the esterification of terephthalic acid with 1,4-butanediol. The catalyst composition, which consists of organic Sn or Ti compounds and organic and/or inorganic salts, was found to provide higher reaction conversion and reduce the production the THF by-product. In Japan Laid-Open Patent Application JP 60-161,455, it is disclosed a process for making polybutylene terephthalate with high impact resistance by reacting terephthalic acid and 1,4-butanediol with alkali metal hypophosphite and vinyl copolymer rubber. In an article which appeared in *J. Appl. Polym. Sci.*, 45(20), pp. 371–373 (1992), it is disclosed that the formation of THF in the preparation of poly(butylene terephthalate) from butanediol and terephthalic acid can be reduced by the addition of potassium and sodium salts. Again, none of these references teaches the use of alkali metal phosphate or alkali metal phosphite as a co-catalyst for use with tetrabutyl titanate, for the production of poly(butylene terephthalate) from dimethyl terephthalate.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

Figure 1:
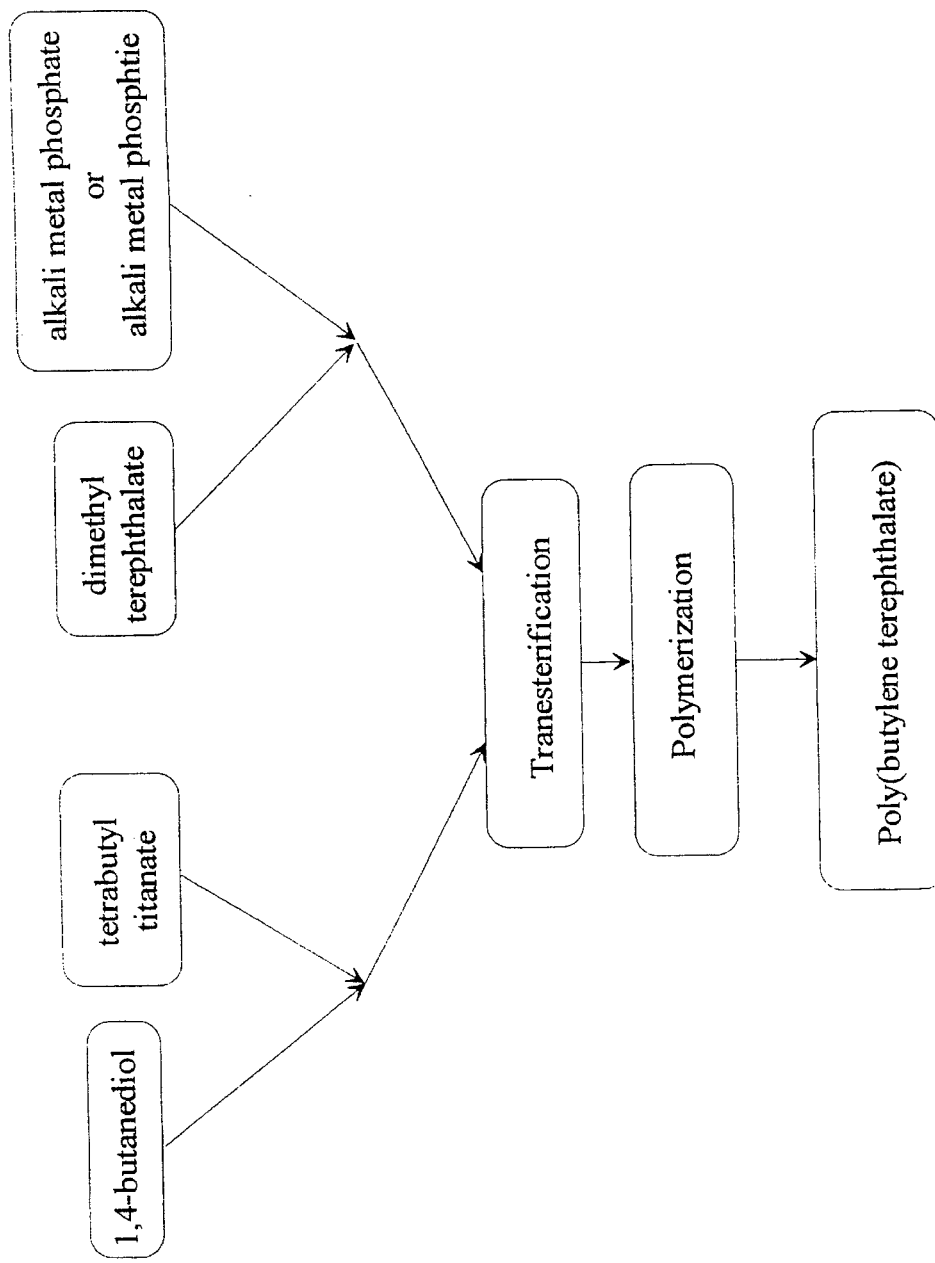
FIG. 1 is a schematic diagram showing the steps involved in a preferred embodiment in utilizing the improved tetrabutyl titanate based catalyst composition disclosed in the present invention for the production of poly(butylene terephthalate) from dimethyl terephthalate.

The present invention discloses an improved tetrabutyl titanate based catalyst composition for the preparation of poly(butylene terephthalate) from dimethyl terephthalate (DMT) and butylene glycol (or 1,4-butanediol, BDO). The improved tetrabutyl titanate based catalyst composition disclosed in the present invention contains: (1) a tetrabutyl titanate primary catalyst, in the amount from about 0.01 PHR (parts per hundred parts, by weight, of dimethyl terephthalate) to about 1 PHR; and (2) an alkali metal phosphate or alkali metal phosphite co-catalyst, in an amount of from about 0.001 PHR to about 1 PHR. The alkali metal phosphate that can be used as the co-catalyst disclosed in the present invention can be a phosphate salt containing one, two, or three metal groups. Examples of the alkali metal phosphates include trisodium phosphate, disodium hydrogen phosphate, and sodium dihydrogen phosphate. The alkali metal phosphite that can be used as the co-catalyst disclosed in the present invention can be a phosphite salt containing one or two metal groups. Examples of the alkali metal phosphites include disodium hydrogen phosphite, and sodium dihydrogen phosphite.

In using the improved tetrabutyl titanate based catalyst composition disclosed in the present invention, the primary catalyst and co-catalyst can be added into the reaction mixture, in which the reactant butylene glycol is typically in excess relative to the dimethyl terephthalate reactant, at the same time. Preferably, the alkali metal phosphate or alkali metal phosphite co-catalyst is first mixed with dimethyl terephthalate and the tetrabutyl titanate primary catalyst is mixed into butylene glycol, which is a liquid, as shown in FIG. 1. Then, also as shown in FIG. 1, the two mixtures are mixed together to form the reaction mixture. As described above, the reaction mechanism can be considered as consisting of two stages—a transesterification stage followed by a condensation polymerization stage. The polymerization reaction is typically conducted at a higher temperature than the transesterification stage and at a higher vacuum.

By adding the alkali metal phosphate or alkali metal phosphite co-catalyst disclosed in the present invention, the transesterification rate was found to have increased by 10 percent or more. Furthermore, the reaction product of poly(butylene terephthalate) showed an increased intrinsic viscosity over those without the co-catalyst, indicating a greater degree of polymerization by adding the alkali metal phosphate or alkali metal phosphite co-catalyst as disclosed in the present invention.

The present invention will now be described more specifically with reference to the following examples. It is to be noted that the following descriptions of example including preferred embodiment of this invention are presented herein for purpose of illustration and description; it is not intended to be exhaustive or to limit the invention to the precise form disclosed.

EXAMPLE 1

A reaction vessel affixed to a fractional distillation column was rinsed thoroughly and blown dry. The temperature of the reaction vessel was gradually raised to 150° C. Reactants dimethyl terephthalate (DMT) and butylene glycol (BDO), in a molar ratio of 1.0:1.7, were precisely measured. The butylene glycol was divided into a small beaker and a large beaker. Tetrabutyl titanate was injected into the small beaker containing butylene glycol using a syringe. The weight of tetrabutyl titanate, in the amount of 0.03 parts per 100 parts of dimethyl terephthalate (PHR, or parts per one hundred parts of resin), was precisely measured. Sodium phosphate, in the amount of 0.03 PHR was added to dimethyl terephthalate to form a sodium phosphate/dimethyl terephthalate mixture.

After the temperature of the reaction vessel reached 150° C., the sodium phosphate/dimethyl terephthalate mixture was poured into the reaction vessel, followed by adding the butylene glycol/tetrabutyl titanate contained in the small beaker. The small beaker was rinsed with the butylene glycol to remove the tetrabutyl titanate that remained therein. The reaction vessel was purged with nitrogen at a flow rate of 20 ml/min to remove air and oxygen. Then, the external temperature of the thermal bath, in which reaction vessel was placed, was set at 265° C., and the ball valve to the fractional distillation column was opened, while the temperature of the fractional distillation column was set at 90° C. This marked the beginning time of the transesterification reaction. Samples were taken from the reaction vessel at predetermined time intervals and were analyzed. After the transesterification reaction was 100% completed, the ball valve connected to the fractional distillation column was closed to stop the reaction. Then a side valve connected to a vacuum pump was opened to create a vacuum inside the reaction vessel. In the same time, the temperature setting of the thermal bath was raised to 295° C. This process continued for 40 minutes when the vacuum inside the reaction vessel reached 1 cm Hg. Thereafter, the vacuuming process was switched to a high-vacuum environment and continued until the vacuum inside the reaction vessel reached 0.5~0.6 torn. The switch to the high-vacuum environment marked the beginning time for the polymerization reaction.

EXAMPLE 2

A reaction vessel affixed to a fractional distillation column was rinsed thoroughly and blown dry. The temperature of the reaction vessel was gradually raised to 150° C. Reactants dimethyl terephthalate (DMT) and butylene glycol (BDO), in a molar ratio of 1.0:1.7, were precisely measured. The butylene glycol was divided into a small beaker and a large beaker. Tetrabutyl titanate was injected into the small beaker containing butylene glycol using a syringe. The weight of tetrabutyl titanate, in the amount of 0.03 parts per 100 parts of dimethyl terephthapate, was precisely measured. Disodium monohydrogen phosphate, in the amount of 0.03 PHR was added to dimethyl terephthalate to form a disodium monohydrogen phosphate/dimethyl terephthalate mixture.

After the temperature of the reaction vessel reached 150° C., the sodium phosphate/dimethyl terephthalate mixture was poured into the reaction vessel, followed by adding the butylene glycol/tetrabutyl titanate contained in the small beaker. The small beaker was rinsed with the butylene glycol to remove the tetrabutyl titanate that remained therein. The reaction vessel was purged with nitrogen at a flow rate of 20 ml/min to remove air and oxygen. Then, the external temperature of the thermal bath, in which reaction vessel was placed, was set at 265° C., and the ball valve to the fractional distillation column was opened, while the temperature of the fractional distillation column was set at 90° C. This marked the beginning time of the transesterification reaction. Samples were taken from the reaction vessel at predetermined time intervals and were analyzed. After the transesterification reaction was 100% completed, the ball valve connected to the fractional distillation column was closed to stop the reaction. Then a side valve connected to a vacuum pump was opened to create a vacuum inside the reaction vessel. In the same time, the temperature setting of the thermal bath was raised to 295° C. This process continued for 40 minutes when the vacuum inside the reaction vessel reached 1 cm Hg. Thereafter, the vacuuming process was switched to a high-vacuum environment and continued until the vacuum inside the reaction vessel reached 0.5~0.6 torr. The switch to the high-vacuum environment marked the beginning time for the polymerization reaction.

EXAMPLE 3

A reaction vessel affixed to a fractional distillation column was rinsed thoroughly and blown dry. The temperature of the reaction vessel was gradually raised to 150° C. Reactants dimethyl terephthalate (DMT) and butylene glycol (BDO), in a molar ratio of 1.0:1.7, were precisely measured. The butylene glycol was divided into a small beaker and a large beaker. Tetrabutyl titanate was injected into the small beaker containing butylene glycol using a syringe. The weight of tetrabutyl titanate, in the amount of 0.03 parts per 100 parts of dimethyl terephthapate, was precisely measured. Monosodium dihydrogen phosphate, in the amount of 0.03 PHR was added to dimethyl terephthalate to form a monosodium dihydrogen phosphate/dimethyl terephthalate mixture.

After the temperature of the reaction vessel reached 150° C., the sodium phosphate/dimethyl terephthalate mixture was poured into the reaction vessel, followed by adding the butylene glycol/tetrabutyl titanate contained in the small beaker. The small beaker was rinsed with the butylene glycol to remove the tetrabutyl titanate that remained therein. The reaction vessel was purged with nitrogen at a flow rate of 20 ml/min to remove air and oxygen. Then, the external temperature of the thermal bath, in which reaction vessel was placed, was set at 265° C., and the ball valve to the fractional distillation column was opened, while the temperature of the fractional distillation column was set at 90° C. This marked the beginning time of the transesterification reaction. Samples were taken from the reaction vessel at predetermined time intervals and were analyzed. After the transesterification reaction was 100% completed, the ball valve connected to the fractional distillation column was closed to stop the reaction. Then a side valve connected to a vacuum pump was opened to create a vacuum inside the reaction vessel. In the same time, the temperature setting of the thermal bath was raised to 295° C. This process continued for 40 minutes when the vacuum inside the reaction vessel reached 1 cm Hg. Thereafter, the vacuuming process was switched to a high-vacuum environment and continued until the vacuum inside the reaction vessel reached 0.5~0.6 torr. The switch to the high-vacuum environment marked the beginning time for the polymerization reaction.

EXAMPLE 4

A reaction vessel affixed to a fractional distillation column was rinsed thoroughly and blown dry. The temperature of the reaction vessel was gradually raised to 150° C. Reactants dimethyl terephthalate (DMT) and butylene glycol (BDO), in a molar ratio of 1.0:1.7, were precisely measured. The butylene glycol was divided into a small beaker and a large beaker. Tetrabutyl titanate was injected into the small beaker containing butylene glycol using a syringe. The weight of tetrabutyl titanate, in the amount of 0.03 parts per 100 parts of dimethyl terephthapate, was precisely measured. Disodium monohydrogen phosphite, in the amount of 0.03 PHR was added to dimethyl terephthalate to form a disodium monohydrogen phosphite/dimethyl terephthalate mixture.

After the temperature of the reaction vessel reached 150° C., the sodium phosphate/dimethyl terephthalate mixture was poured into the reaction vessel, followed by adding the butylene glycol/tetrabutyl titanate contained in the small beaker. The small beaker was rinsed with the butylene glycol to remove the tetrabutyl titanate that remained therein. The reaction vessel was purged with nitrogen at a flow rate of 20 ml/min to remove air and oxygen. Then, the external temperature of the thermal bath, in which reaction vessel was placed, was set at 265° C., and the ball valve to the fractional distillation column was opened, while the temperature of the fractional distillation column was set at 90° C. This marked the beginning time of the transesterification reaction. Samples were taken from the reaction vessel at predetermined time intervals and were analyzed. After the transesterification reaction was 100% completed, the ball valve connected to the fractional distillation column was closed to stop the reaction. Then a side valve connected to a vacuum pump was opened to create a vacuum inside the reaction vessel. In the same time, the temperature setting of the thermal bath was raised to 295° C. This process continued for 40 minutes when the vacuum inside the reaction vessel reached 1 cm Hg. Thereafter, the vacuuming process was switched to a high-vacuum environment and continued until the vacuum inside the reaction vessel reached 0.5~0.6 torr. The switch to the high-vacuum environment marked the beginning time for the polymerization reaction.

Comparative Example 1

The procedure in Comparative Example 1 was identical to that in Example 1, except that no sodium phosphate was added.

EXAMPLE 5

The poly(butylene terephthalate) prepared from Example 1 was measured for its intrinsic viscosity using a Cannon No. 150 viscometer at a temperature of 30°±0.1° C. The poly(butylene terephthalate) was dissolved in a solvent containing phenol/tetrachloroethane in a ratio of 6/4 by weight. The measured intrinsic viscosity, which is summarized in Table 1, was 1.17 dl/g.

EXAMPLE 6

The poly(butylene terephthalate) prepared from Example 2 was measured for its intrinsic viscosity using a Cannon No. 150 viscometer at a temperature of 30°±0.1° C. The poly(butylene terephthalate) was dissolved in a solvent containing phenol/tetrachloroethane in a ratio of 6/4 by weight. The measured intrinsic viscosity, which is summarized in Table 1, was 1.00 dl/g.

EXAMPLE 7

The poly(butylene terephthalate) prepared from Example 3 was measured for its intrinsic viscosity using a Cannon No. 150 viscometer at a temperature of 30°±0.1° C. The poly(butylene terephthalate) was dissolved in a solvent containing phenol/tetrachloroethane in a ratio of 6/4 by weight. The measured intrinsic viscosity, which is summarized in Table 1, was 1.14 dl/g.

EXAMPLE 8

The poly(butylene terephthalate) prepared from Example 4 was measured for its intrinsic viscosity using a Cannon No. 150 viscometer at a temperature of 30°±0.1° C. The poly(butylene terephthalate) was dissolved in a solvent containing phenol/tetrachloroethane in a ratio of 6/4 by weight. The measured intrinsic viscosity, which is summarized in Table 1, was 0.99 dl/g.

Comparative Example 2

The poly(butylene terephthalate) prepared from Comparative Example 1 was measured for its intrinsic viscosity using a Cannon No. 150 viscometer at a temperature of 30°±0.1° C. The poly(butylene terephthalate) was dissolved in a solvent containing phenol/tetrachloroethane in a ratio of 6/4 by weight. The measured intrinsic viscosity, which is summarized in Table 1, was 0.84 dl/g.

TABLE 1

| Catalyst Composition | Trans-esterification time (min.) | Poly-merization time (min.) | Intrinsic viscosity (dl/g) |
| --- | --- | --- | --- |
| Tetrabutyl titanate | 116 | 80 | 0.84 |
| Tetrabutyl titanate/ sodium phosphate | 102 | 80 | 1.17 |
| Tetrabutyl titanate/ disodium monohydrogen phosphate | 103 | 80 | 1.00 |
| Tetrabutyl titanate monosodium dihydrogen phosphate | 105 | 80 | 1.14 |
| Tetrabutyl titanate/ disodium monohydrogen phosphite | 114 | 80 | 0.99 |

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A catalyst composition for use in the preparation of poly(butylene terephthalate) from dimethyl terephthalate, comprising:

(a) a titanium compound primary catalyst, from about 0.01 PHR wherein said titanium compound primary catalyst is tetrabutyl titanate or tetra(isopropyl) titanate to about 1 PHR wherein said titanium compound primary catalyst is tetrabutyl titanate or tetra(isopropyl) titanate; and (b) an alkali metal phosphate or alkali metal phosphite co-catalyst, from about 0.001 PHR to about 1 PHR; wherein PHR represents parts, by weight, of said primary catalyst or said co-catalyst per one hundred parts, by weight, of dimethyl terephthalate.

2. A catalyst composition for use in the preparation of poly(butylene terephthalate) according to claim 1 wherein said poly(butylene terephthalate) is prepared from an transesterification and polymerization of said dimethyl terephthalate with butylene glycol monomer.

3. A catalyst composition for use in the preparation of poly(butylene terephthalate) from dimethyl terephthalate according to claim 1 wherein said titanium compound is present in a amount between about 0.01 PHR to about 0.6 PHR.

4. A catalyst composition for use in the preparation of poly(butylene terephthalate) from dimethyl terephthalate according to claim 1 wherein said alkali metal phosphate contains one, two or three of said alkali metals.

5. A catalyst composition for use in the preparation of poly(butylene terephthalate) from dimethyl terephthalate according to claim 1 wherein said alkali metal in said alkali metal phosphate is lithium, sodium, or potassium, and said alkali metal phosphate contains one, two or three of said lithium, sodium, or potassium atoms.

6. A catalyst composition for use in the preparation of poly(butylene terephthalate) from dimethyl terephthalate according to claim 1 wherein said alkali metal phosphite contains one or two of said alkali metals.

7. A catalyst composition for use in the preparation of poly(butylene terephthalate) from dimethyl terephthalate according to claim 1 wherein said alkali metal in said alkali metal phosphite is lithium, sodium, or potassium, and said alkali metal phosphate contains one or two of said lithium, sodium, or potassium atoms.

8. A catalyst composition for use in the preparation of poly(butylene terephthalate) from dimethyl terephthalate according to claim 1 wherein said alkali metal phosphate or said alkali metal phosphite is present in an amount between about 0.01 PHR to about 0.6 PHR.

9. A process for the preparation of poly(butylene terephthalate) from dimethyl terephthalate and butylene glycol comprising the steps of:
   (a) preparing a catalyst composition containing:
      (a) a titanium compound primary catalyst, from about 0.01 PHR to about 1 PHR wherein said titanium compound primary catalyst is tetrabutyl titanate or tetra(isopropyl) titanate; and
      (b) an alkali metal phosphate or alkali metal phosphite co-catalyst, from about 0.001 PHR to about 1 PHR; wherein PHR represents parts of said primary catalyst or said co-catalyst per hundred parts, by weight, of the theoretical value of said poly(butylene terephthalate) resin to be produced);
   (b) placing said catalyst composition, said dimethyl terephthalate and said butylene glycol in a reaction vessel, said butylene glycol being in excess relative to said dimethyl terephthalate;
   (c) raising reaction temperature to about 200°–280° C. to start a transesterification reaction;
   (d) raising reaction temperature to about 240°–300° C. and applying vacuum in said reaction vessel to start a polymerization reaction; and
   (e) removing unreacted butylene glycol from reaction product to obtain said poly(butylene terephthalate).

10. A process for the preparation of poly(butylene terephthalate) from dimethyl terephthalate according to claim 9 wherein said titanium compound is present in a amount between about 0.01 PHR to about 0.6 PHR.

11. A process for the preparation of poly(butylene terephthalate) from dimethyl terephthalate according to claim 9 wherein said alkali metal phosphate contains one, two or three of said alkali metals.

12. A process for the preparation of poly(butylene terephthalate) from dimethyl terephthalate according to claim 9 wherein said alkali metal in said alkali metal phosphate is lithium, sodium, or potassium, and said alkali metal phosphate contains one, two or three of said lithium, sodium, or potassium atoms.

13. A process for the preparation of poly(butylene terephthalate) from dimethyl terephthalate according to claim 11 wherein said alkali metal phosphite contains one or two of said alkali metals.

14. A process for the preparation of poly(butylene terephthalate) from dimethyl terephthalate according to claim 1 wherein said alkali metal in said alkali metal phosphite is lithium, sodium, or potassium, and said alkali metal phosphate contains one or two of said lithium, sodium, or potassium atoms.

15. A process for the preparation of poly(butylene terephthalate) from dimethyl terephthalate according to claim 1 wherein said titanium compound is present in an amount between about 0.01 PHR to about 0.6 PHR.

* * * * *